United States Patent
Zhu et al.

(10) Patent No.: US 10,306,730 B1
(45) Date of Patent: May 28, 2019

(54) LIGHT STATE REGULATION CONTROLLER, CONTROL SYSTEM AND CONTROL METHOD

(71) Applicant: Shanghai LIS Semiconductor Technology Co., Ltd., Shanghai (CN)

(72) Inventors: Zhen Zhu, Shanghai (CN); Haifeng Miao, Shanghai (CN); Pengfei Lu, Shanghai (CN); Junsheng Fang, Shanghai (CN)

(73) Assignee: Shanghai LIS Semiconductor Technology Co., Ltd., Shanghai (CN)

( * ) Notice: Subject to any disclaimer, the term of this patent is extended or adjusted under 35 U.S.C. 154(b) by 0 days.

(21) Appl. No.: 16/009,467

(22) Filed: Jun. 15, 2018

(30) Foreign Application Priority Data

Nov. 6, 2017 (CN) .......................... 2017 1 1078462

(51) Int. Cl.
*H05B 37/02* (2006.01)
*H05B 33/08* (2006.01)
*H02M 7/06* (2006.01)

(52) U.S. Cl.
CPC ..... *H05B 33/0887* (2013.01); *H05B 33/0815* (2013.01); *H02M 7/06* (2013.01); *H05B 33/0848* (2013.01)

(58) Field of Classification Search
CPC .................. H05B 33/0815; H05B 33/0848

USPC .................................................. 315/291, 308
See application file for complete search history.

(56) References Cited

U.S. PATENT DOCUMENTS

| | | | | |
|---|---|---|---|---|
| 2015/0282262 | A1* | 10/2015 | Lai | H05B 33/0815 315/200 R |
| 2016/0066378 | A1* | 3/2016 | Wang | H05B 33/0815 307/31 |
| 2016/0359421 | A1* | 12/2016 | Lin | H02M 3/33592 |
| 2017/0196055 | A1* | 7/2017 | Jao | H05B 33/0815 |

* cited by examiner

*Primary Examiner* — Thuy V Tran
(74) *Attorney, Agent, or Firm* — Christopher & Weisberg, P.A.

(57) ABSTRACT

The present disclosure provides a light state regulation controller, control system and control method. The controller comprises a peak current comparator, a PWM controller, a power switch, a state detector and a state machine. The peak current comparator produces a PWM turn-off signal according to a comparison result between a peak current sampling signal and a reference voltage. The PWM controller outputs a PWM control signal and the reference voltage under the control of the PWM turn-off signal and a state control signal, wherein the state control signal controls the state of the PWM control signal. The state detector detects a state change in the PWM control signal or an equivalent signal for the PWM control signal, and outputs a state input signal. The state machine produces a plurality of states according to the state input signal, and outputs the state control signal reflecting the plurality of states.

10 Claims, 12 Drawing Sheets

LIGHT STATE REGULATION CONTROLLER, CONTROL SYSTEM AND CONTROL METHOD

CROSS-REFERENCE TO RELATED APPLICATION

This application claims priority to Chinese Patent Application Serial No. 201711078462.5, filed Nov. 6, 2017, titled LIGHT STATE REGULATION CONTROLLER, CONTROL SYSTEM AND CONTROL METHOD, the entirety of which is incorporated herein by reference.

STATEMENT REGARDING FEDERALLY SPONSORED RESEARCH OR DEVELOPMENT n/a

TECHNICAL FIELD

The present disclosure primarily relates to the light state regulation of lamps, especially to a light state regulation controller, control system and control method.

BACKGROUND

In the application of light-emitting diodes (LEDs), switch state control is widely applied to the control over many lamps. Compared with many kinds of intelligent light-regulation control, such control has the advantages of a simple system, low costs, strong substitutability, etc.

Figure 1:
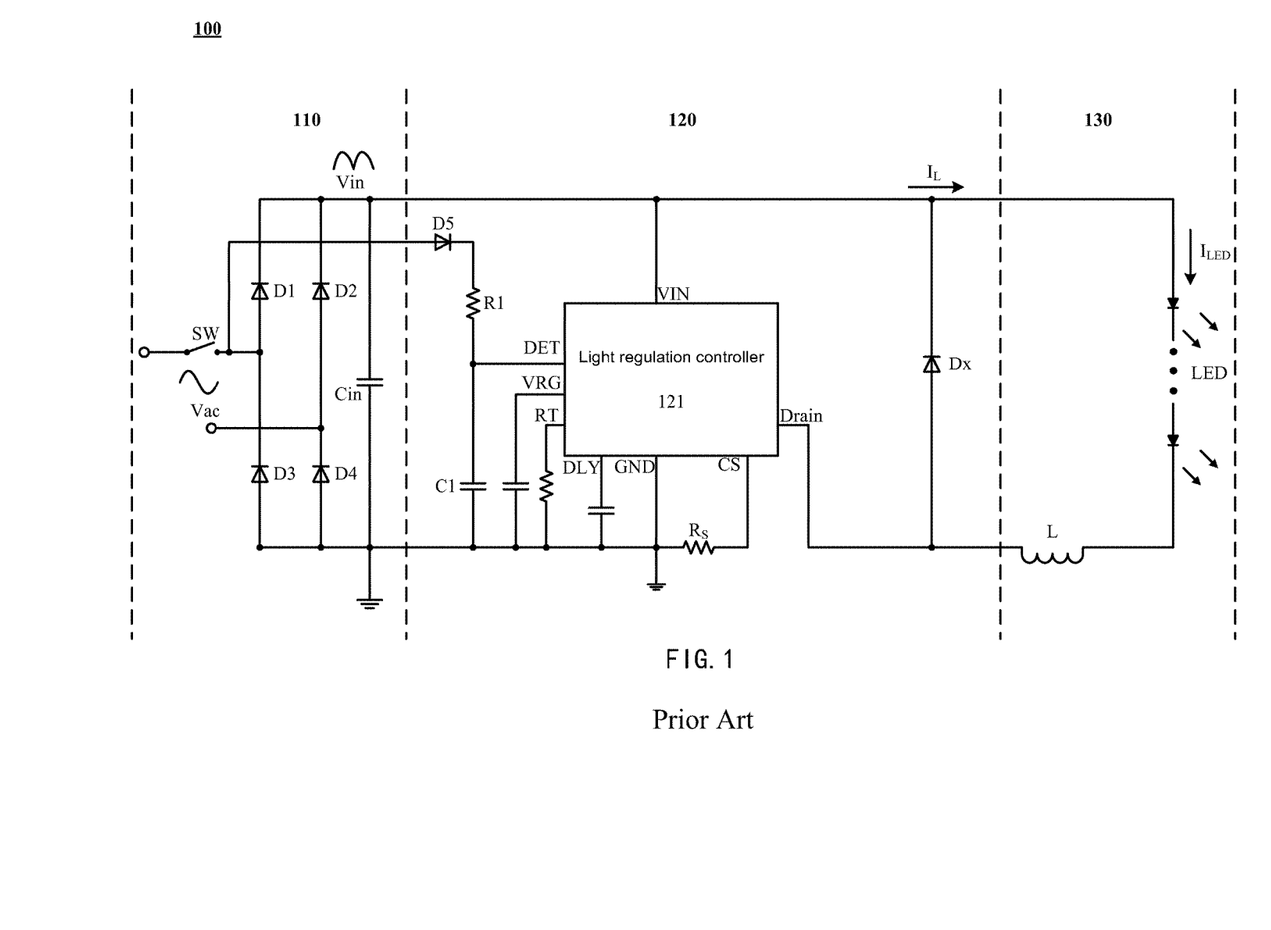
FIG. 1 is a schematic diagram of an existing switch light-regulation control system.

FIG. 1 is a schematic diagram of an existing switch light-regulation control system. With reference to FIG. 1, a switch light-regulation control system 100 commonly seen at present comprises an input rectifier 110, a light state regulation control circuit 120 and an output stage circuit 130. In the switch light-regulation control system 100 of FIG. 1, a diode D5, a resistor R1 and a capacitor C1 constitute a state sampling circuit for sampling a state of a switch before a rectifier bridge. A neutral line or live line voltage at a front end of the rectifier bridge is directly detected, and a state control signal is produced on a detection pin DET of a light state regulation controller 121 via two actions, i.e., turn-off and turn-on actions of a main loop switch (a wall switch) (SW). A discharge loop is integrated inside the light state regulation controller 121 to pull down the voltage at the DET pin when the switch is off, realizing state switching, thereby changing the state of an output load (i.e., an LED).

The advantages of such a light-regulation control system are having a fast response speed and being free from the impact of the output load. Once the switch (SW) is off, the isolated diode D5 immediately reverses, causing the voltage at the detection pin (DET) to decrease quickly, thus forming an effective state control signal, so that the Pulse Width Modulation (PWM) control state of the light state regulation controller 121 changes quickly, and thus the modulation of an output current of the LED is realized.

However, such a light-regulation control system still has its defects. Firstly, a component for sampling a switch state should be additionally added, leading to increased system costs; secondly, if an X capacitor C1 is added before the rectifier bridge, when the switch (SW) is off, a discharge time constant would increase due to a voltage keeping effect of the X capacitor, and the time period for forming an effective state control signal is extended, thereby easily causing a false action of the switch state.

SUMMARY

The present disclosure provides a light state regulation controller, control system and control method, which can leave out components for state sampling.

According to an aspect of the present disclosure, a light state regulation controller, comprises a peak current comparator, a PWM controller, a power switch, a state detector and a state machine. The peak current comparator has a first input end and a second input end, the first input end of which is used for inputting a reference voltage and the second input end of which is used for inputting a peak current sampling signal, wherein the peak current comparator is operable to produce a PWM turn-off signal according to a comparison result between the peak current sampling signal and the reference voltage. A first input end of the PWM controller is used for inputting the PWM turn-off signal, and a second input end thereof is used for inputting a state control signal, wherein the PWM controller is operable to output a PWM control signal and the reference voltage under the control of the PWM turn-off signal and the state control signal, with the state control signal controlling the state of the PWM control signal. A control end of the power switch is connected to the PWM control signal. An input end of the state detector is used for inputting the PWM control signal or an equivalent signal for the PWM control signal, wherein the state detector is operable to detect a state change in the PWM control signal or the equivalent signal for the PWM control signal, and outputs a state input signal. An input end of the state machine is used for inputting the state input signal, wherein the state machine is operable to produce a plurality of states according to the state input signal, and outputs the state control signal reflecting the plurality of states.

In one embodiment of the present disclosure, the state detector comprises: a Positive Channel Metal Oxide Semiconductor (PMOS) switch, a discharge current source, a delay filter capacitor and a phase inverter, wherein a gate electrode of the PMOS switch is connected to the PWM control signal, a source electrode of the PMOS switch is connected to a power source, a drain electrode of the PMOS switch is connected to the ground through the discharge current source, the filter capacitor is connected between the drain electrode of the PMOS switch and the ground, and an input end of the phase inverter is connected to the drain electrode of the PMOS switch and an output end thereof outputs the state input signal.

In one embodiment of the present disclosure, the state control signal comprises a plurality of bits of binary codes.

In one embodiment of the present disclosure, the state of the PWM control signal comprises a frequency, a duty cycle, and an enable or disable output.

The present disclosure also proposes a light state regulation control system, comprising an input rectifier, a light state regulation control circuit and an output stage circuit which are successively connected, wherein the light state regulation control circuit comprises the light state regulation controller as stated above.

In one embodiment of the present disclosure, the light state regulation control system further comprises a current sampling resistor, wherein the current sampling resistor is connected between a negative output end of the input rectifier and the peak current comparator.

In one embodiment of the present disclosure, the PWM controller is operable to output a PWM control signal with a duty cycle change or a frequency change under the control of the state control signal, so as to change the lightness of a load in the output stage circuit.

In one embodiment of the present disclosure, the light state regulation control system comprises a plurality of the light state regulation controllers and a plurality of corresponding output stage circuits, the state machines of the light state regulation controllers are operable to output different state control signal, and the PWM controllers of the light state regulation controllers are in an enable or disable output state independently from one another under the control of the state control signals, so that the loads of the plurality of output stage circuits compose different combinations of lightness and darkness.

In one embodiment of the present disclosure, the state detectors of the light state regulation controllers are all connected to one synchronous detection signal.

The present disclosure also proposes a light state regulation control method, comprising the following steps of: producing a PWM turn-off signal according to a comparison result between a peak current sampling signal and a reference voltage; outputting a PWM control signal and the reference voltage according to the PWM turn-off signal and a state control signal, wherein the state control signal controls the state of the PWM control signal; detecting a state change in the PWM control signal or an equivalent signal for the PWM control signal, and producing a state input signal; and producing a plurality of states according to the state input signal, and outputting the state control signal reflecting the plurality of states.

In comparison with the prior art, in the present disclosure, a plurality of state signals are produced directly according to a PWM signal, thus leaving out a component for switch state sampling and a state detection pin, and removing the impact of the X capacitor on switch state detection; furthermore, since PWM has a high frequency and a quick state change, the present disclosure can respond to the change in switch states in time.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

To make the above-mentioned objects, features and advantages of the present disclosure more obvious and easy to understand, the particular embodiments of the present disclosure will be further described in detail below in conjunction with the accompanying drawings.

In the following description, numerous specific details are set forth in order to fully understand the present disclosure, but the present disclosure can also be implemented in other ways different from those described herein; therefore, the present disclosure is not limited to the particular embodiments disclosed hereinafter.

As used in the present application and the claims, unless an exception is clearly prompted in the context, words such as "a", "an", "one" and/or "the" does not specially mean singular, but can also include plural. Generally, terms "comprise" and "contain" only prompt that steps and elements that have already been specifically identified are included; however, these steps and elements do not constitute an exclusive list, and a method or device may also contain the other steps or elements.

The embodiments of the present disclosure propose a light state regulation control system and a light state regulation controller, which can leave out components for switch state sampling and state detection pins, and can remove the impact of the X capacitor on switch state detection.

Embodiment I

Figure 2:
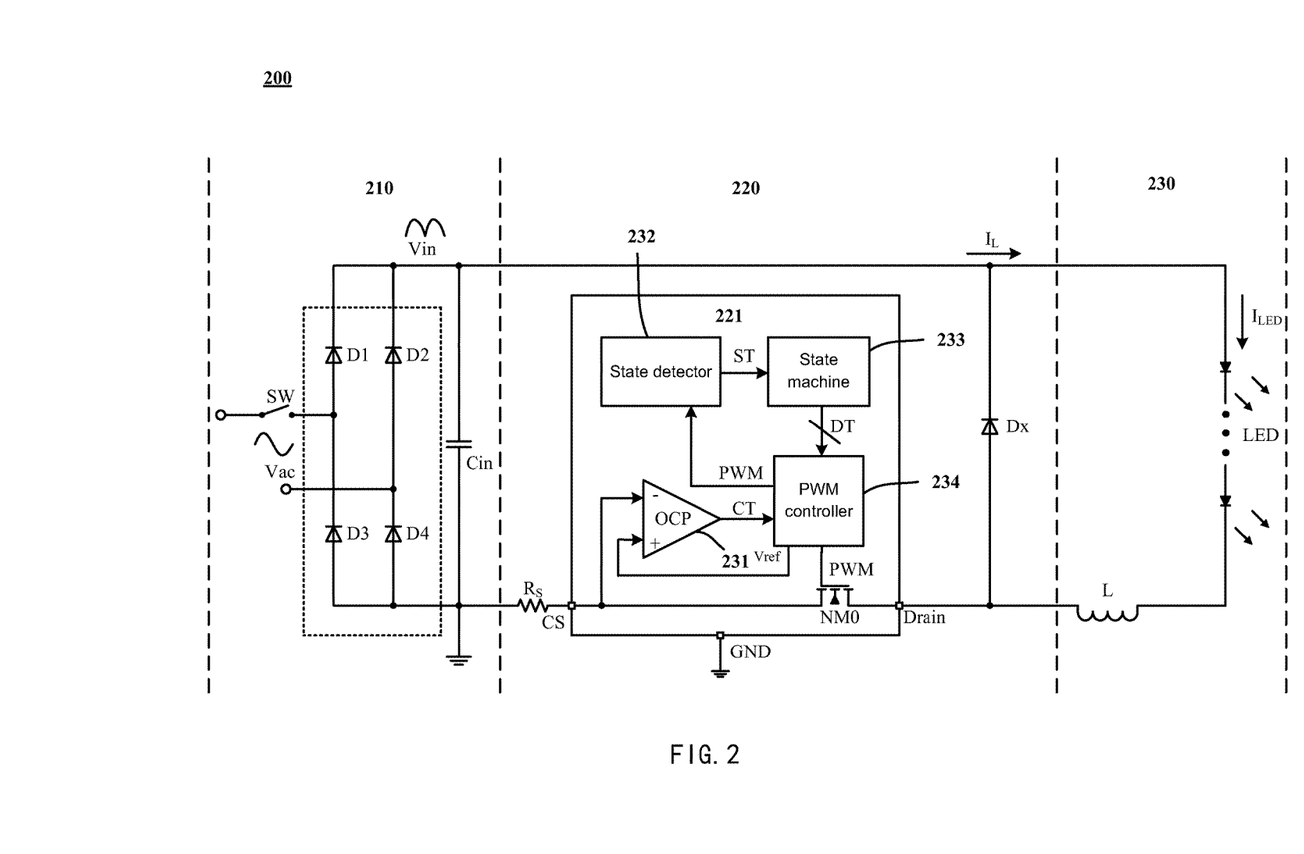
FIG. 2 is schematic diagram of a light state regulation control system and a controller thereof according to one embodiment of the present disclosure.

FIG. 2 is schematic diagram of a light state regulation control system and a controller thereof according to one embodiment of the present disclosure. With reference to FIG. 2, the light state regulation control system 200 of this embodiment can be a system for driving a buck type LED. The system 200 mainly comprises an input rectifier 210, a light state regulation control circuit 220 and an output stage circuit 230. An input end of the input rectifier 210 is connected to an alternating current source Vac, and a switch (SW) is arranged at the input end. The switch (SW) can be arranged on a neutral wire or a phase line. The input rectifier 210 is a typical rectifier bridge. In the embodiment shown in FIG. 2, the rectifier bridge can be a rectifier bridge composed by four discrete diodes D1-D4. In other embodiments, there may be an integrated rectifier bridge chip in the rectifier.

An input capacitor Cin is arranged between the input rectifier 210 and a light state regulation control circuit 220.

The light state regulation control circuit 220 can comprise a light state regulation controller 221, a current sampling resistor Rs and a free-wheeling diode DX. The light state regulation controller 221 has a current sampling pin CS, a drive pin Drain and a ground pin GND, and the current sampling pin CS is connected to a negative end of the input rectifier 210 via the current sampling resistor Rs. The drive pin Drain is connected to a negative output end of the light state regulation control circuit 220. The ground pin GND is connected to the ground. The free-wheeling diode Dx is connected between a positive output end and the negative output end of the light state regulation control circuit 220. For the sake of simplification, the other pins of the switch light state regulation controller 221, e.g., a power pin, are not described in this embodiment. A person skilled in the art can design these pins according to the existing knowledge in the art, which will not be discussed herein.

The output stage circuit 230 can comprise a power inductor L and an LED load. The LED load is connected between the positive output end and the negative output end of the light state regulation control circuit 220. One end of the power inductor L is connected to the negative output end (at the drive pin Drain) of the light state regulation control circuit 220, and the other end thereof is connected to a cathode of the LED load.

The switch light state regulation controller 221 is configured to be able to take a PWM control signal (or an equivalent signal therefor) of a power switch NMO as a state indication signal reflecting a switch state, and process this signal to form an effective state control signal, thus controlling the drive current state of the LED. For this reason, the switch light state regulation controller 221 can comprise a peak current comparator (OCP) 231, a state detector 232, a state machine 233, a PWM controller 234 and a power switch NMO. One input end (shown as a positive input end in the drawing) of the peak current comparator 231 is used for inputting a reference voltage Vref, and the other input end thereof is connected to the current sampling pin CS. The peak current comparator 231 would produce a PWM turn-off signal CT according to a peak current sampling signal. Particularly, a peak current sampling signal Vcs sampled on the Rs resistor when the power switch NMO is on is detected, and the PWM turn-off signal CT is produced when the peak current sampling signal Vcs is equal to the reference voltage Vref.

In the embodiments of the present disclosure, an equivalent signal for the PWM control signal can be a signal containing a high-frequency pulse signal part and a constant level part thereof, e.g., a drain electrode output Vd of the power switch NMO.

The PWM controller 234 has two input signals, one being the PWM turn-off signal CT output by the peak current comparator 231, and the other one being a state control signal DT output by the state machine 233. The PWM controller 234 can output, under the control of the PWM turn-off signal CT and the state control signal DT, a PWM control signal and the reference voltage Vref to be provided to the peak current comparator 231. The PWM controller 234 produces the reference voltage according to the state control signal DT. Here, the state control signal DT controls the state of the PWM control signal. By way of example, the state can be a frequency, a duty cycle, and an enable or disable output. In particular, when the switch (SW) is in an on state, the PWM control signal drives a power switch NMO in the form of a high-frequency pulse, and when the switch (SW) is off, a power grid stops providing energy to the output LED load, and only the input capacitor Cin provides energy for the output load; therefore, the voltage on the input capacitor Cin gradually decreases. When the voltage VCin on the input capacitor Cin is lower than the switch-on voltage drop of the LED load, the peak current sampling signal Vcs will be unable to reach a threshold voltage Vref of the peak current comparator 231, and thus be unable to produce the PWM turn-off signal CT; therefore, the PWM control signal will be in a long-pass (high level) state.

The state detector 232 detects and processes state changes in the PWM control signal that occur with the switch (SW) performing switch switching, so as to form a state input signal ST.

The signal ST controls the state change in the state machine 233 as a state input signal ST of the state machine 233. The state machine 233 produces a plurality of states according to the state input signal (ST), and outputs the state control signal DT reflecting these states. The state control signal DT output by the state machine 233 controls the state of an output current by controlling the state (e.g., a frequency, a duty cycle, and an enable or disable output) of the PWM control signal.

Figure 3:
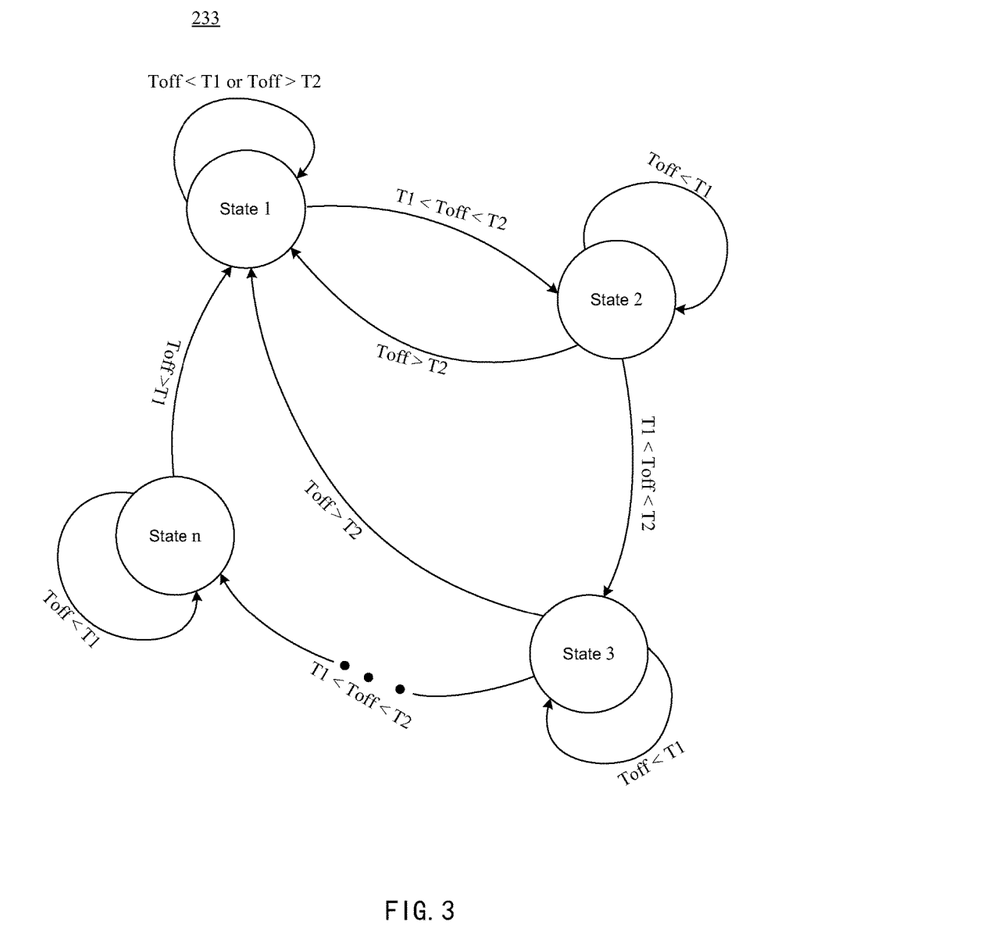
FIG. 3 is a schematic diagram of a state machine for light state regulation control according to one embodiment of the present disclosure.

The state input signal ST for controlling the state machine 233 can be a square-wave signal, which is produced by a PWM signal. When the PWM signal is in a turning on/off state, the ST is in a low level; and when the PWM signal changes to a continuous high level, the ST changes to a high level. For an example of the production of the state input signal ST, reference can be made to FIG. 5. Of course, the level of the state input signal ST can also be inverted. FIG. 3 is a schematic diagram of a state machine for light state control of one embodiment of the present disclosure. With reference to FIG. 3, when Toff satisfies the condition:

$$T1 < Toff < T2 \qquad (1)$$

the states will successively switch from an initial state (state 1) to state 2, state 3 . . . , and eventually return to state 1, where T1 and T2 are system-set time constants. when:

$$Toff < T1 \qquad (2)$$

the state does not change; and when:

$$Toff > T2 \qquad (3)$$

all the states will return back to the initial state (state 1).

In this embodiment, the number of states is not defined, and there may be two or more states.

Figure 5:
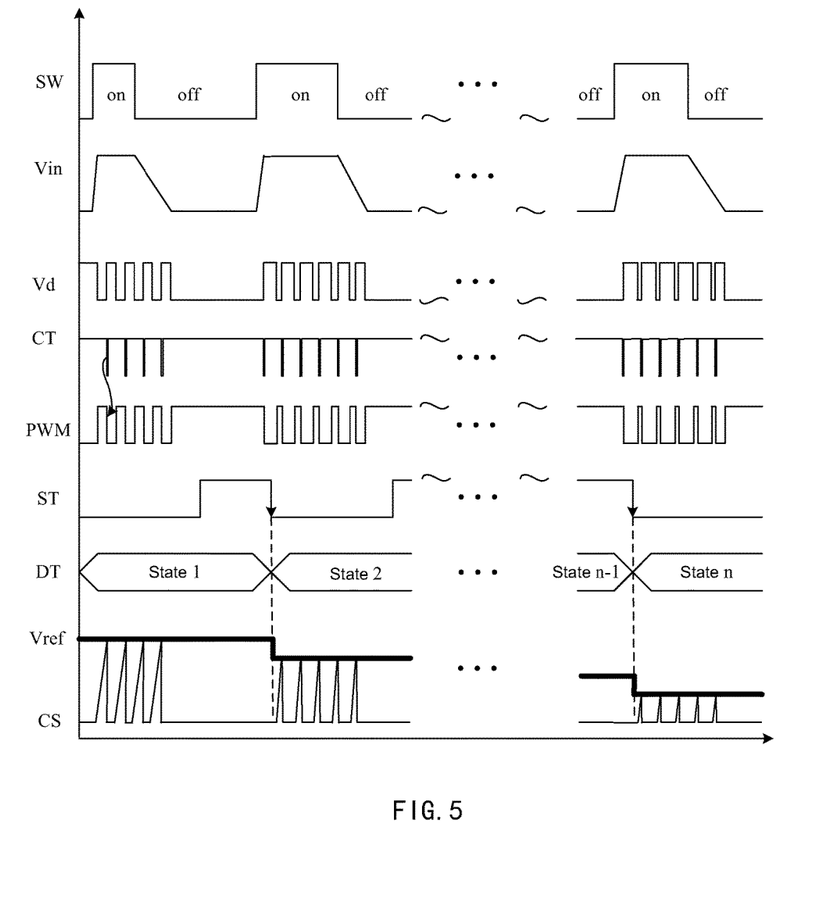
FIG. 5 is a waveform graph of light state regulation according to one embodiment of the present disclosure.

FIG. 5 is a waveform graph of light state regulation control according to one embodiment of the present disclosure. In conjunction with FIGS. 2 and 5, when the switch (SW) enters an on state, the PWM control signal output by the PWM controller 234 is a high-frequency pulse width modulation signal; and when the switch (SW) enters an off state, the rectified input voltage Vin gradually decreases. When the input voltage Vin is lower than the conducting voltage of the LED, the PWM control signal output by the PWM controller 234 stops high-frequency pulse width modulation and keeps in a high level, and causes the state input signal ST output by the state detector 232 to change from low to high; and when the switch (SW) is on again, the input voltage Vin quickly increases, and the PWM control signal changes to a high-frequency pulse width modulation signal again, causing the state input signal ST to decrease to a low level, and a falling edge thereof causes the occurrence of state switching to the state control signal DT of the state machine 233. Successively switching the switch (SW) can enable the state of the state machine 233 to circulate between state 1 to state n.

By inputting the state control signal DT into the PWM controller 234, the frequency and duty cycle of the PWM control signal output by the PWM controller can be controlled, so as to control the current output to the load, thereby controlling the lightness of the LED load.

Exemplary details of various components of a switch light state regulation controller of the embodiments of the present disclosure are described below. It can be understood that the exemplary details below are provided for the purpose of explanation, but not for restricting the scope of the present application. For a person skilled in the art, various variations and modifications can be made under the teaching of the present application. However, these variations and modifications do not depart from the scope of the present application.

Figure 4:
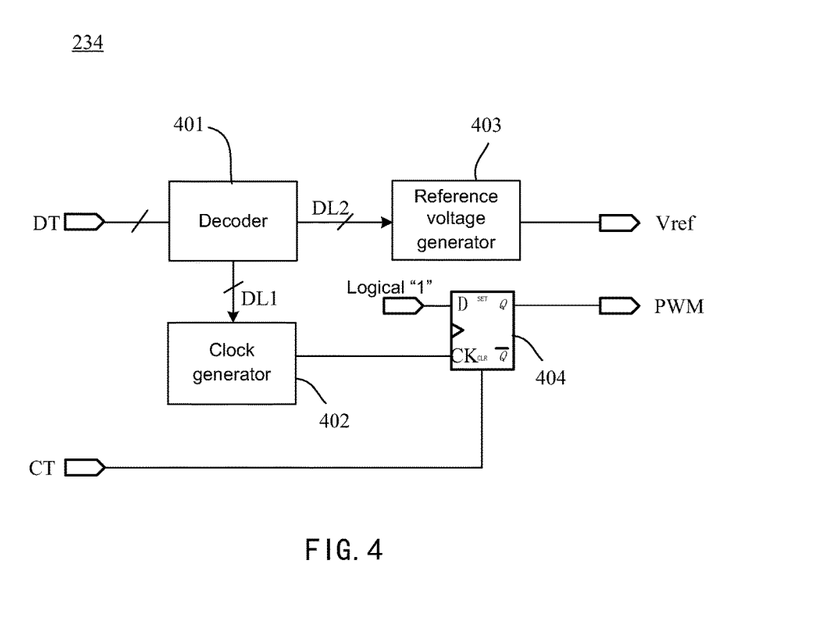
FIG. 4 is an exemplary PWM controller of a switch light state regulation controller according to one embodiment of the present disclosure.

FIG. 4 is an exemplary PWM controller of a switch light state regulation controller according to one embodiment of the present disclosure. As shown in the figures, the PWM controller 234 can comprise a decoder 401, a clock generator 402, a reference voltage generator 403 and a trigger 404. By inputting the state control signal DT to the decoder 401, two groups of control words DL1 and DL2 are respectively produced. DL1 and DL2 are respectively input into the clock generator 402 and the reference voltage generator 403, and respectively control the frequency of a clock signal CLK output by the clock generator 402 and a voltage value of a reference voltage Vref output by the reference voltage generator 403. The clock signal CLK is input into a clock control pin of the trigger 404, so as to control the frequency of a PWM signal output by the trigger 404, whereas a Vref signal is input into the peak current comparator 231 (as shown in FIG. 2), so as to control the duty cycle of PWM. Therefore, the state control signal DT can simultaneously control the frequency and duty cycle of the PWM signal through the clock generator 402 and the reference voltage generator 403, and can control the "disable" and "enable" states of the PWM signal by controlling the clock signal (for example, it is a "disable" state if the clock signal continues to be logical "0", and is an "enable" state if the clock signal outputs a normal pulse signal).

Figure 6:
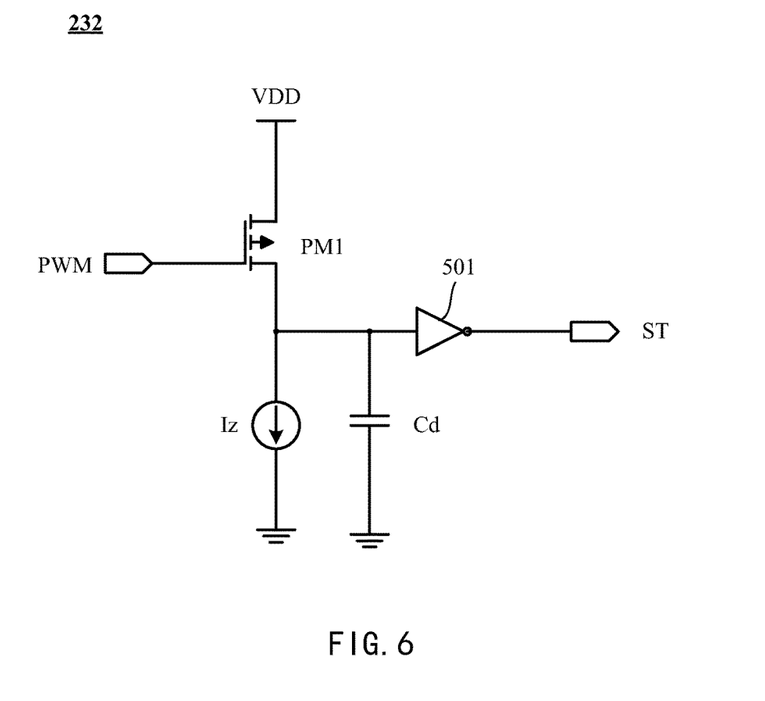
FIG. 6 is an exemplary state detector of a light state regulation controller according to one embodiment of the present disclosure.

FIG. 6 is an exemplary state detector of a switch light state regulation controller of one embodiment of the present disclosure. With reference to FIG. 6, the state detector 232 can comprise a PMOS switch PM1, a discharge current source Iz, a delay filter capacitor Cd and a phase inverter 501. In conjunction with FIG. 5, the function of the discharge current source Iz and the filter capacitor Cd is to filter out a high-frequency pulse width modulation pulse of a PWM control signal as a state indication signal, to obtain a square signal, i.e., a state input signal ST. It can be understood that there are the other circuits converting the PWM control signal shown in FIG. 5 into an ST signal, for example, the discharge current source may also be a resistor.

Figure 7A:
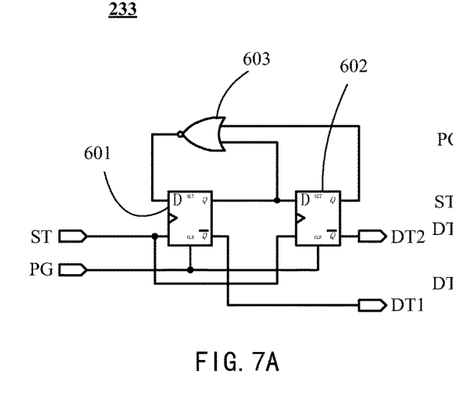
FIGS. 7A and 7B are an exemplary state machine of a light state regulation controller according to one embodiment of the present disclosure.
Figure 7B:
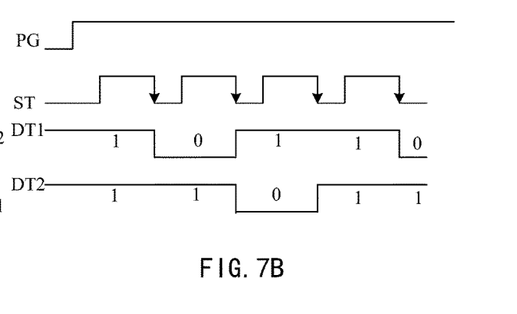

FIGS. 7A and 7B are an exemplary state machine of a light state regulation controller of one embodiment of the present disclosure. In this example, the state machine 233 outputs state control signals DT1 and DT2 of 2 bits under the control of the state input signal ST. As shown in FIG. 7A, the state machine 233 can comprise D triggers 601 and 602, and a NOR gate 603. The state input signal ST is input into a clock end of the D triggers 601 and 602. A Q end of the D trigger 601 is connected to a D end of the D trigger 602 and one input end of the NOR gate 603, and a Q end of the D trigger 602 is connected to the other input end of the NOR gate 603. An output end of the NOR gate 603 is connected to a D end of the D trigger 601. The Q end of the D trigger 601 and the Q end of the D trigger 602 respectively output the state control signal DT1 and DT2. A PG signal is a power-on zero clearing signal, and an initial state is set for the state machine 233. The operation waveform graph of the state machine 233 is as shown in FIG. 7B. A falling edge of the state input signal ST triggers the changes of the state control signals DT1 and DT2. The state control signals DT1 and DT2 cyclically change among 11, 01 and 10.

Embodiment II

Figure 8:
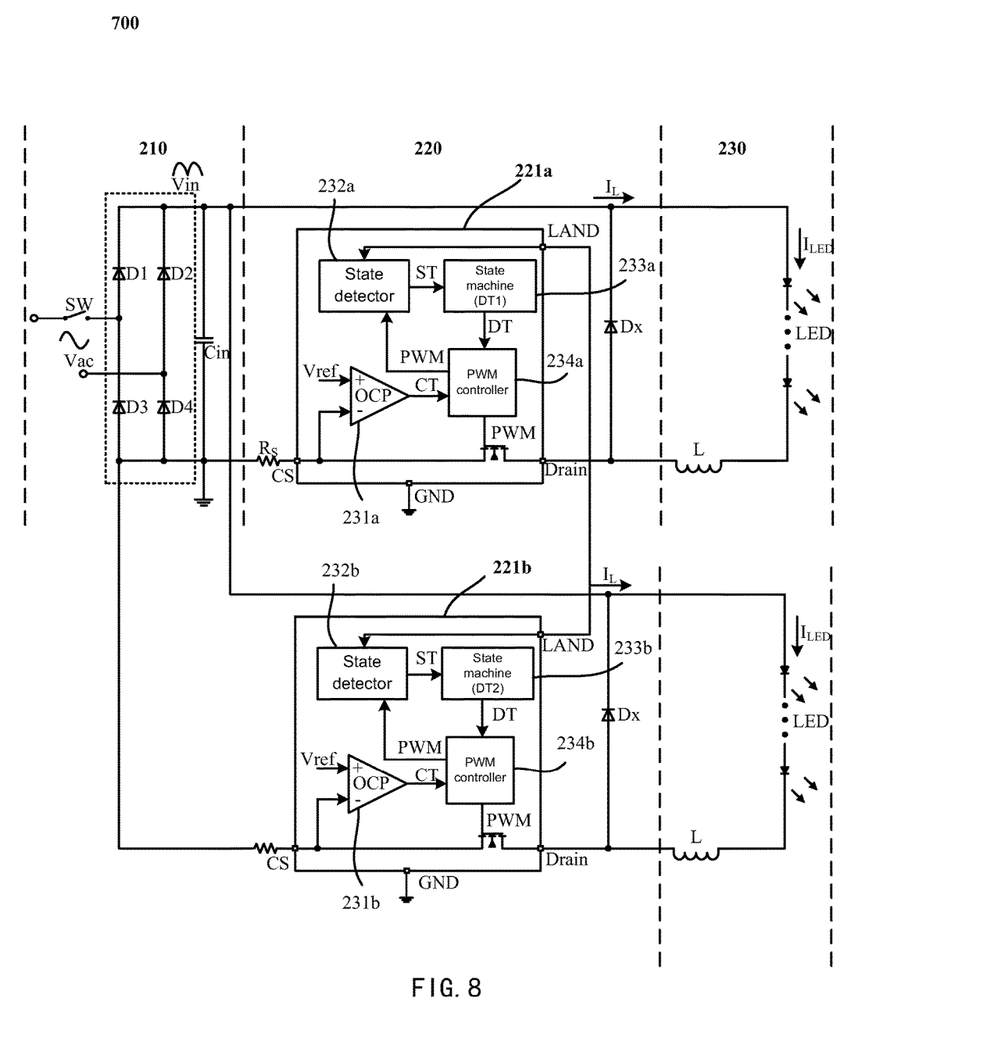
FIG. 8 is schematic diagram of a light state regulation control system and a controller thereof according to another embodiment of the present disclosure.

FIG. 8 is a schematic diagram of a light state regulation control system and a controller thereof of another embodiment of the present disclosure. As shown in FIG. 8, a light state regulation control system 800 mainly comprises an input rectifier 210, a light state regulation control circuit 220 and an output stage circuit 230. Different from Embodiment I, the light state regulation control circuit 220 of this embodiment contains two light state regulation controllers 221a and 221b. The difference between the two light state regulation controllers 221a and 221b lies in that the state machines 233a and 233b are different. A combination of the two state machines 233a and 233b can realize the function of colour temperature regulation. For example, the light state regulation controller 221a corresponds to a warm light LED, and the light state regulation controller 221b corresponds to a cold light LED; and colour temperature regulation can be realized by means of the combination of the warm light LED and the cold light LED. Furthermore, in order to synchronize state detection, an input/output pin LAND can be added, and the LAND pins of the two light state regulation controllers 221a and 221b are connected together.

Figure 9:
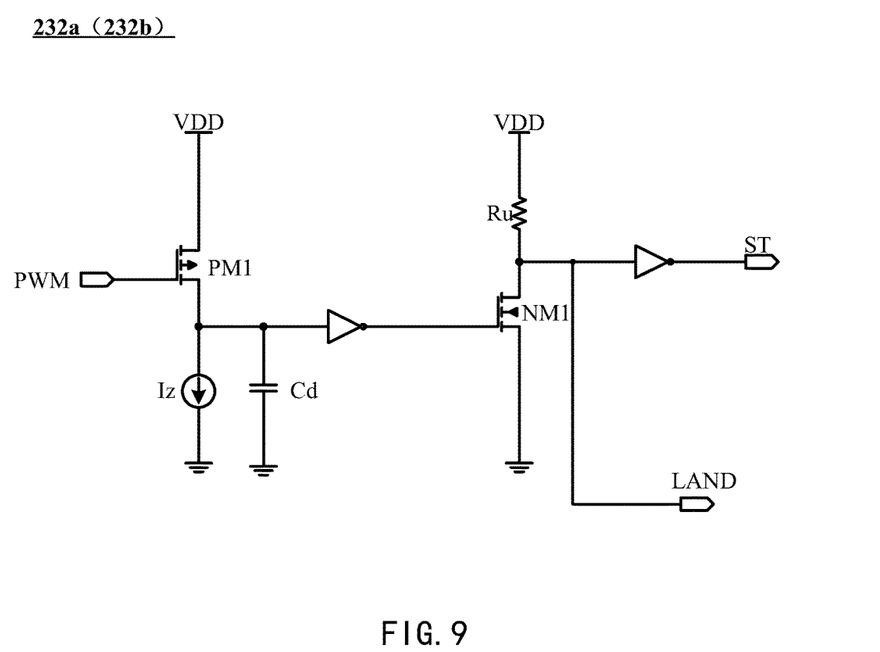
FIG. 9 is an exemplary state detector in a light state regulation controller of a light state regulation control system according to another embodiment of the present disclosure.

FIG. 9 is an exemplary state detector in a light state regulation controller of a light state regulation control system of another embodiment of the present disclosure. Different from the circuit shown in FIG. 6, an input/output pin LAND is added in this embodiment, and the LAND pins of the light state regulation controllers 221a and 221b are connected together to introduce synchronous detection signals, in order to ensure that the state detection of the state detectors 232a and 232b is synchronous.

Figure 10A:
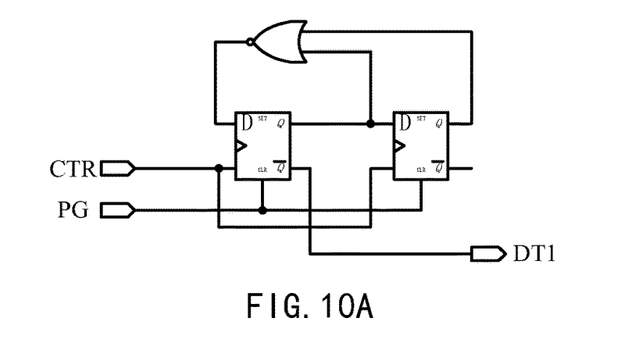
FIGS. 10A to 10C are an exemplary state machine in a light state regulation controller of a light state regulation control system according to another embodiment of the present disclosure.
Figure 10B:
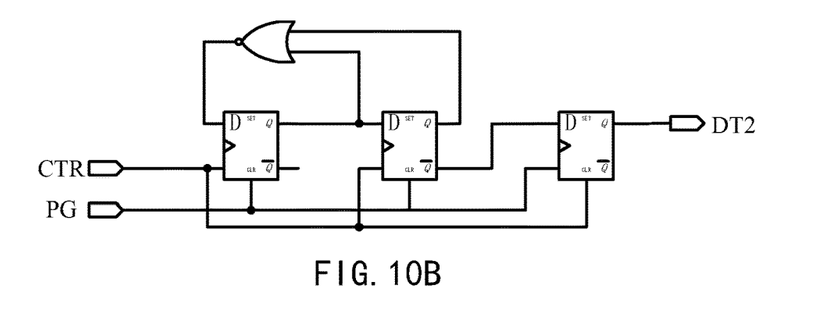
Figure 10C:
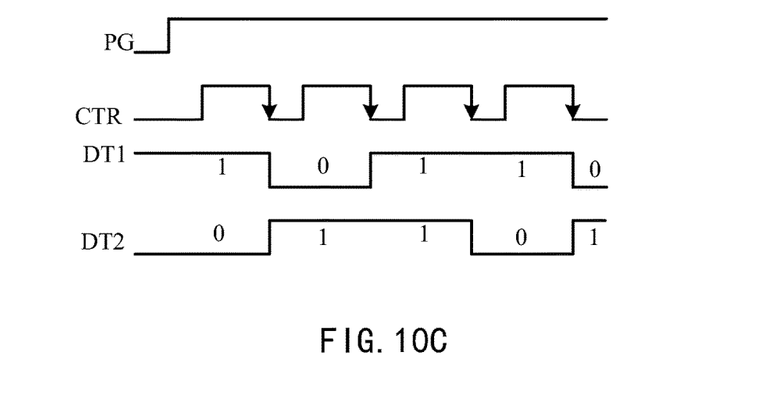

FIGS. 10A to 10C are exemplary state machines in a light state regulation controller of a light state regulation control system of another embodiment of the present disclosure, wherein FIGS. 10A and 10B are respectively the circuits of the state machines 232a and 232b of the light state regulation controllers 221a and 221b, and FIG. 10C exemplifies timing diagrams of the two state machines. It can be seen from the figures that the state of DT1 successively circulates according to 101; and the state of DT1 successively circulates according to 011. If "1" represents light on and "0" represents light off, and the light state regulation controller 221a corresponds to a warm light LED and the light state regulation controller 221b corresponds to a cold light LED, a combination of output states successively circulates according to: warm light on and cold light off→cold light on and warm light off→cold light and warm light both on, thus realizing the gradual regulation of color temperatures.

For the other details of the light state regulation control system and controller of this embodiment, reference can be made to Embodiment I, which will not be described here.

Embodiment III

Figure 11:
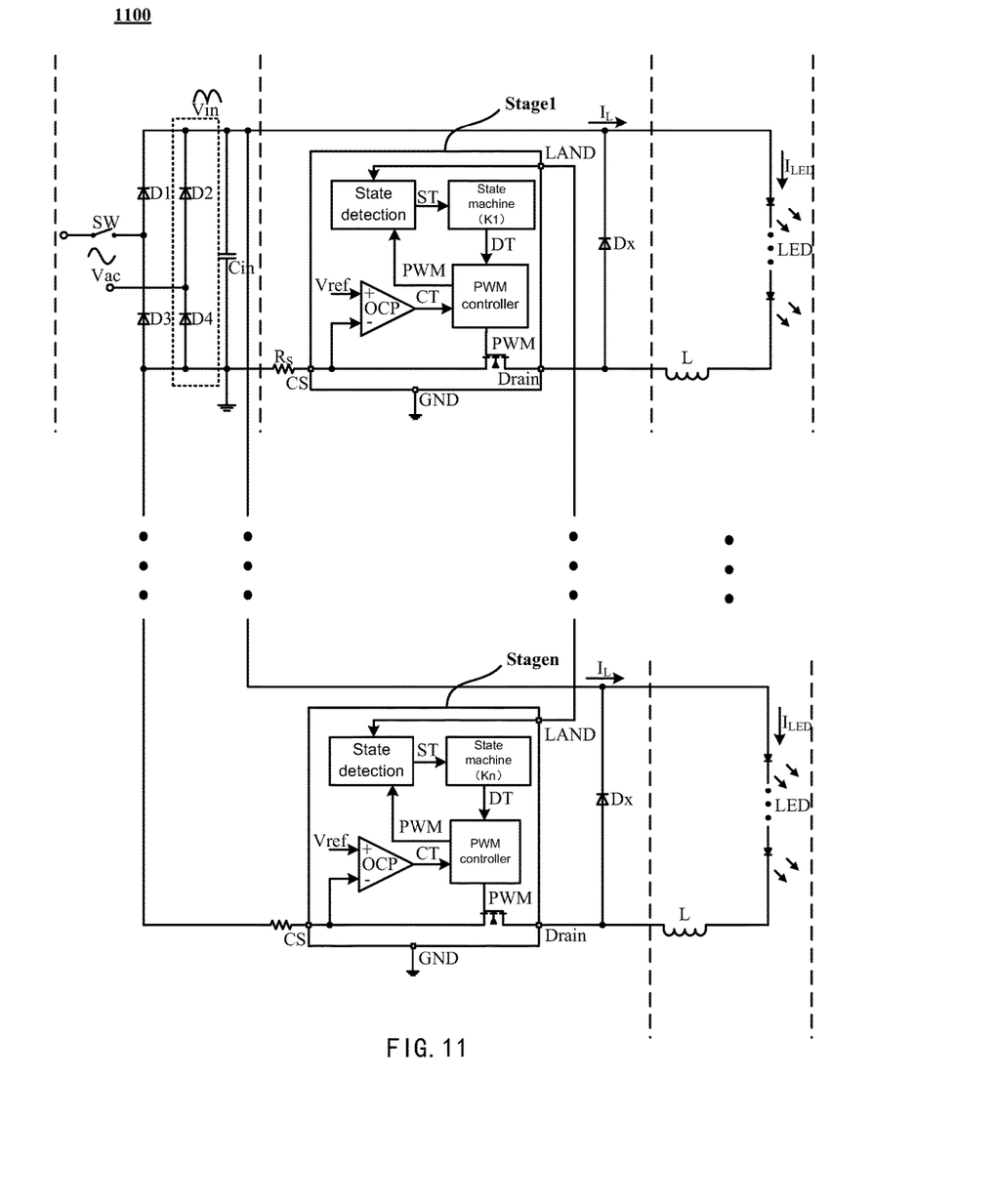
FIG. 11 is schematic diagram of a light state regulation control system according to a further embodiment of the present disclosure.
Figure 12:
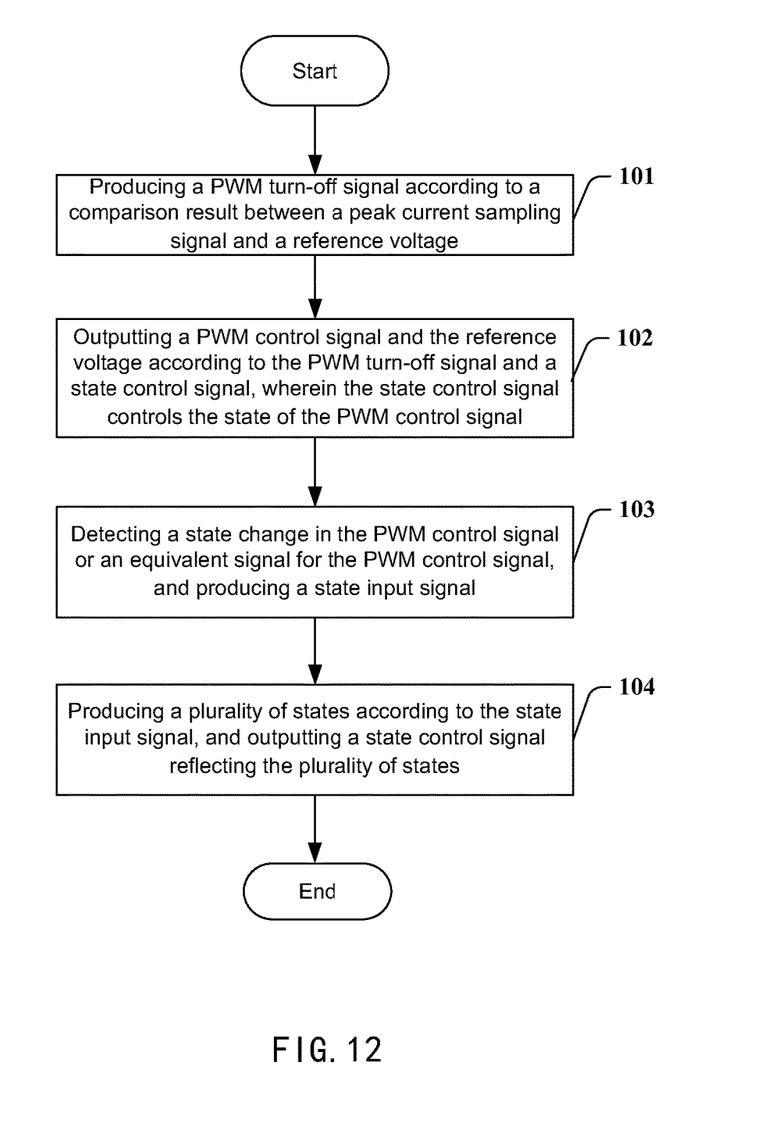
FIG. 12 is flow chart of a light state regulation control method according to one embodiment of the present disclosure.

FIG. 11 is schematic diagram of a light state regulation control system according to a further embodiment of the present disclosure. The system 1100 is composed of n self-driven systems connected in parallel. The structure of each of the self-driven system can be the structure as shown in FIG. 1. In particular, the self-driven system has an independent state machine, and each of the self-driven systems is connected by a LAND pin so as to synchronize state detection. At most $m^n$ different light regulation states can be realized by a combination of n states, where m is the number of states of each state machine, and n is the number of regulation controllers.

For the other details of the light state regulation control system and controller of this embodiment, reference can be made to Embodiment I, which will not be described here.

Embodiment IV

The embodiments of the present disclosure provide a light state regulation control method, comprising the following steps of:

in step 101, producing a PWM turn-off signal according to a comparison result between a peak current sampling signal and a reference voltage;

in step 102, outputting a PWM control signal and the reference voltage according to the PWM turn-off signal and a state control signal, wherein the state control signal controls the state of the PWM control signal;

in step 103, detecting a state change in the PWM control signal or an equivalent signal for the PWM control signal, and outputting a state input signal; and in step 104, producing a plurality of states according to the state input signal, and outputting the state control signal reflecting the plurality of states.

For the exemplary details of the method, reference can be made to the aforementioned embodiments, and description will not be made here.

The method can be implemented in the aforementioned circuit, and can also be implemented in the other circuits.

Although the present disclosure has been described with reference to the present particular embodiments, the ordinary skilled in the art is to recognize that these embodiments are only for illustrating the present disclosure, and that various equivalent changes or replacements can be made without departing from the spirit of the present disclosure; hence, changes and variations to the above-mentioned embodiments within the true spirit scope of the present disclosure will all fall into the scope of the claims of the present application.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A light state regulation controller, comprising:
a peak current comparator having a first input end and a second input end, the first input end of the peak current comparator is used for inputting a reference voltage and the second input end of the peak current comparator is configured to input a peak current sampling signal, the peak current comparator produces a Pulse Width Modulation (PWM) turn-off signal according to a comparison result between the peak current sampling signal and the reference voltage;
a PWM controller, a first input end of the PWM controller is used for inputting the PWM turn-off signal and a second input end of the PWM controller is used for inputting a state control signal, wherein the PWM controller is configured to output a PWM control signal and the reference voltage under the control of the PWM turn-off signal and the state control signal, with the state control signal controlling the state of the PWM control signal;
a power switch, a control end of the power switch is connected to the PWM control signal;
a state detector, an input end of the state detector is used for inputting the PWM control signal or an equivalent signal for the PWM control signal, the state detector is configured to detect a state change in the PWM control signal or an equivalent signal for the PWM control signal, and outputs a state input signal; and
a state machine, an input end of the state machine is used for inputting the state input signal, wherein the state machine is configured to produce a plurality of states according to the state input signal, and output the state control signal reflecting the plurality of states.

2. The light state regulation controller according to claim 1, wherein the state detector comprises: a positive-channel metal-oxide-semiconductor (PMOS) switch, a discharge current source, a filter capacitor and a phase inverter, wherein a gate electrode of the PMOS switch is connected to the PWM control signal, a source electrode of the PMOS switch is connected to a power source, a drain electrode of the PMOS switch is connected to a ground through the discharge current source, the filter capacitor is connected between the drain electrode of the PMOS switch and the ground, and an input end of the phase inverter is connected to the drain electrode of the PMOS switch and an output end thereof outputs the state input signal.

3. The light state regulation controller according to claim 1, wherein the state control signal comprises a plurality of bits of binary codes.

4. The light state regulation controller according to claim 1, wherein the state of the PWM control signal comprises a frequency, a duty cycle, and an enable or disable output.

5. A light state regulation control system, comprising an input rectifier, a light state regulation control circuit and an output stage circuit which are successively connected, the light state regulation control circuit comprises a light state regulation controller including:
a peak current comparator having a first input end and a second input end, the first input end of the peak current comparator is used for inputting a reference voltage and the second input end of the peak current comparator is configured to input a peak current sampling signal, the peak current comparator produces a Pulse Width Modulation (PWM) turn-off signal according to a comparison result between the peak current sampling signal and the reference voltage;
a PWM controller, a first input end of the PWM controller is used for inputting the PWM turn-off signal and a second input end of the PWM controller is used for inputting a state control signal, the PWM controller is configured to output a PWM control signal and the reference voltage under the control of the PWM turn-off signal and the state control signal, with the state control signal controlling the state of the PWM control signal;
a power switch, a control end of the power switch is connected to the PWM control signal;
a state detector, an input end of the state detector is used for inputting the PWM control signal or an equivalent signal for the PWM control signal, the state detector is configured to detect a state change in the PWM control signal or an equivalent signal for the PWM control signal, and outputs a state input signal; and a state machine, an input end of the state machine is used for inputting the state input signal, the state machine is configured to produce a plurality of states according to the state input signal, and output the state control signal reflecting the plurality of states.

6. The light state regulation control system according to claim 5, further comprising a current sampling resistor, the current sampling resistor is connected between a negative output end of the input rectifier and the peak current comparator.

7. The light state regulation control system according to claim 5, wherein the PWM controller is configured to output a PWM control signal with a duty cycle change or a frequency change under the control of the state control signal, so as to change the lightness of a load in the output stage circuit.

8. The light state regulation control system according to claim 5, comprising a plurality of the light state regulation controllers and a plurality of corresponding output stage circuits, the state machines of the light state regulation controllers are configured to output different state control signals, and the PWM controllers of the light state regulation controllers are in an enable or disable output state independently from one another under the control of the state control signals, so that loads of the plurality of output stage circuits compose different combinations of lightness and darkness.

9. The light state regulation control system according to claim 8, wherein the state detectors of the light state regulation controllers are all connected to one synchronous detection signal.

10. A light state regulation control method, comprising:
producing a Pulse Width Modulation (PWM) turn-off signal according to a comparison result between a peak current sampling signal and a reference voltage;

outputting a PWM control signal and the reference voltage according to the PWM turn-off signal and a state control signal, wherein the state control signal controls the state of the PWM control signal;

detecting a state change in the PWM control signal or an equivalent signal for the PWM control signal, and producing a state input signal; and producing a plurality of states according to the state input signal, and outputting the state control signal reflecting the plurality of states.

* * * * *